United States Patent
Brett et al.

(10) Patent No.: US 6,271,908 B1
(45) Date of Patent: Aug. 7, 2001

(54) EXPOSURE CONTROL FOR CINEMATOGRAPHIC FILMS USING TELECINE APPARATUS

(75) Inventors: Stephen Brett, Swaney Village; Martin John Greenwood, London, both of (GB)

(73) Assignee: Pandora International Limited, Northfleet (GB)

(*) Notice: Subject to any disclaimer, the term of this patent is extended or adjusted under 35 U.S.C. 154(b) by 0 days.

(21) Appl. No.: 09/440,444

(22) Filed: Nov. 15, 1999

Related U.S. Application Data

(63) Continuation-in-part of application No. 08/759,274, filed on Dec. 2, 1996, now abandoned.

(30) Foreign Application Priority Data

Dec. 1, 1996 (GB) .................................................. 9524559

(51) Int. Cl.⁷ .......................... G03B 27/52; G03B 27/32; H04N 5/253; H04N 3/36
(52) U.S. Cl. ................................ 355/40; 355/77; 348/96; 348/97
(58) Field of Search .......................... 355/32, 35, 38–41, 355/77; 348/96, 97; 358/512

(56) References Cited

U.S. PATENT DOCUMENTS

| | | | |
|---|---|---|---|
| 5,010,410 | * | 4/1991 | Bernstein ............................ 358/214 |
| 5,276,522 | * | 1/1994 | Mead .................................. 358/214 |
| 5,469,209 | * | 11/1995 | Gunday et al. ....................... 348/96 |
| 5,671,008 | * | 9/1997 | Linn .................................... 348/97 |
| 5,808,725 | * | 9/1998 | Moberg et al. ....................... 355/67 |

FOREIGN PATENT DOCUMENTS

| | | |
|---|---|---|
| 2632715 | 1/1978 | (DE) . |
| 9709821 | 3/1997 | (WO) . |

* cited by examiner

*Primary Examiner*—Russell Adams
*Assistant Examiner*—Hung Henry Nguyen
(74) *Attorney, Agent, or Firm*—McDonnell Boehnen Hulbert & Berghoff

(57) ABSTRACT

A method of controlling a telecine machine to produce an exposure log of cinematographic film, comprising the steps of: using a telecine machine to generate video images from the cinematographic film, and displaying the video images on a monitor; generating timecode data for frames of the cinematographic film; generating image adjustment control data to adjust image parameters of the video images generated by the telecine machine so as to produce video images of a desired quality; using the image adjustment control data to generate exposure level information for frames of the cinematographic film; and logging in a film exposure logging system timecode data and exposure level information for frames of the cinematographic film so as to provide the exposure log. In one arrangement the cinematographic film is negative cinematographic film and the exposure log is used to generate exposure compensation printing settings for frames of the negative cinematographic film. Positive cinematographic film is then printed from the negative cinematographic film, by passing light through the negative cinematographic film to the unexposed positive cinematographic film. The exposure compensation printing settings are used to provide compensation for sub-optimal exposure levels of frames in the negative cinematographic film. In another arrangement the exposure log is used to control the exposure of subsequent negative cinematographic film, providing a reference for a film director, cinematographer or the like.

9 Claims, 4 Drawing Sheets

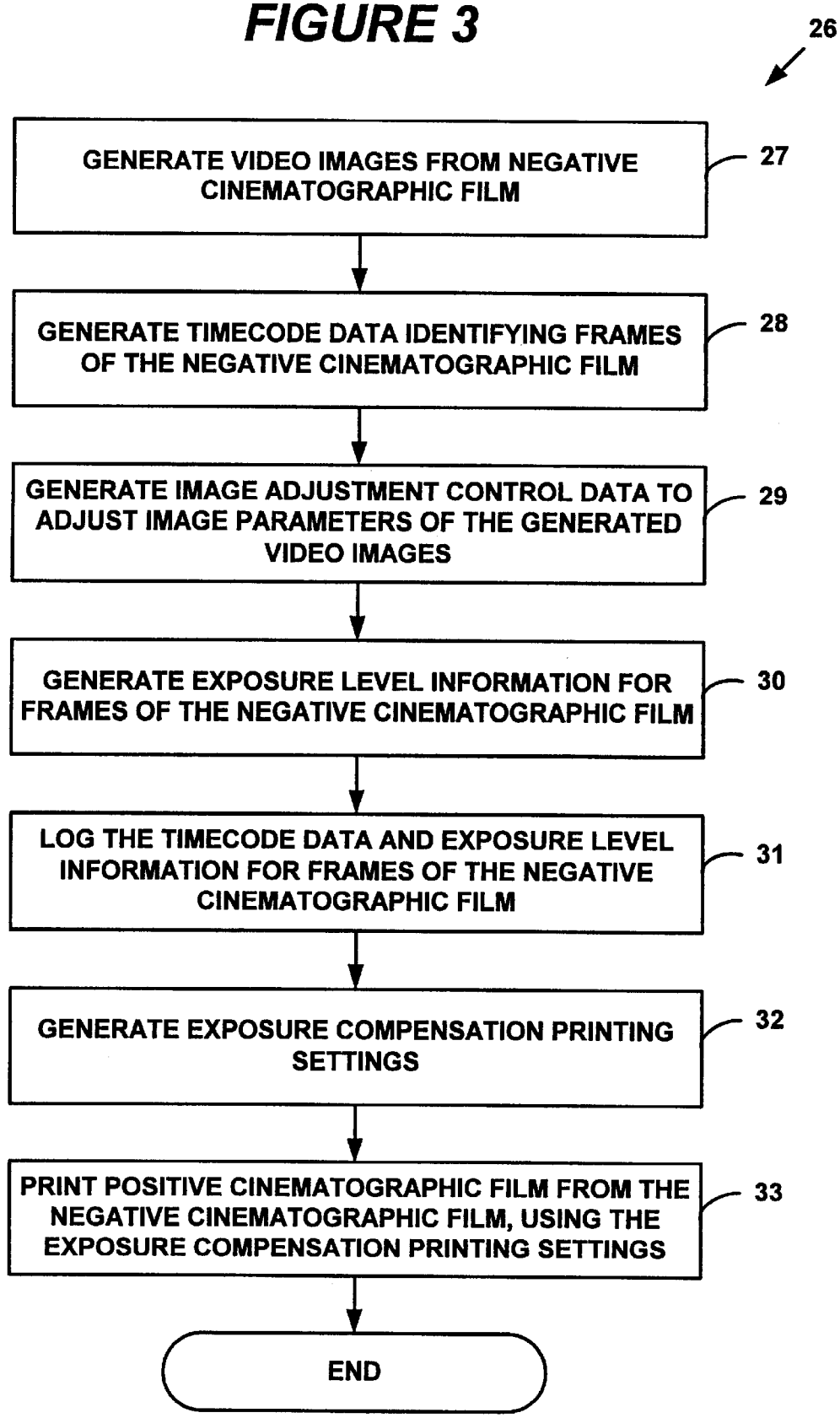

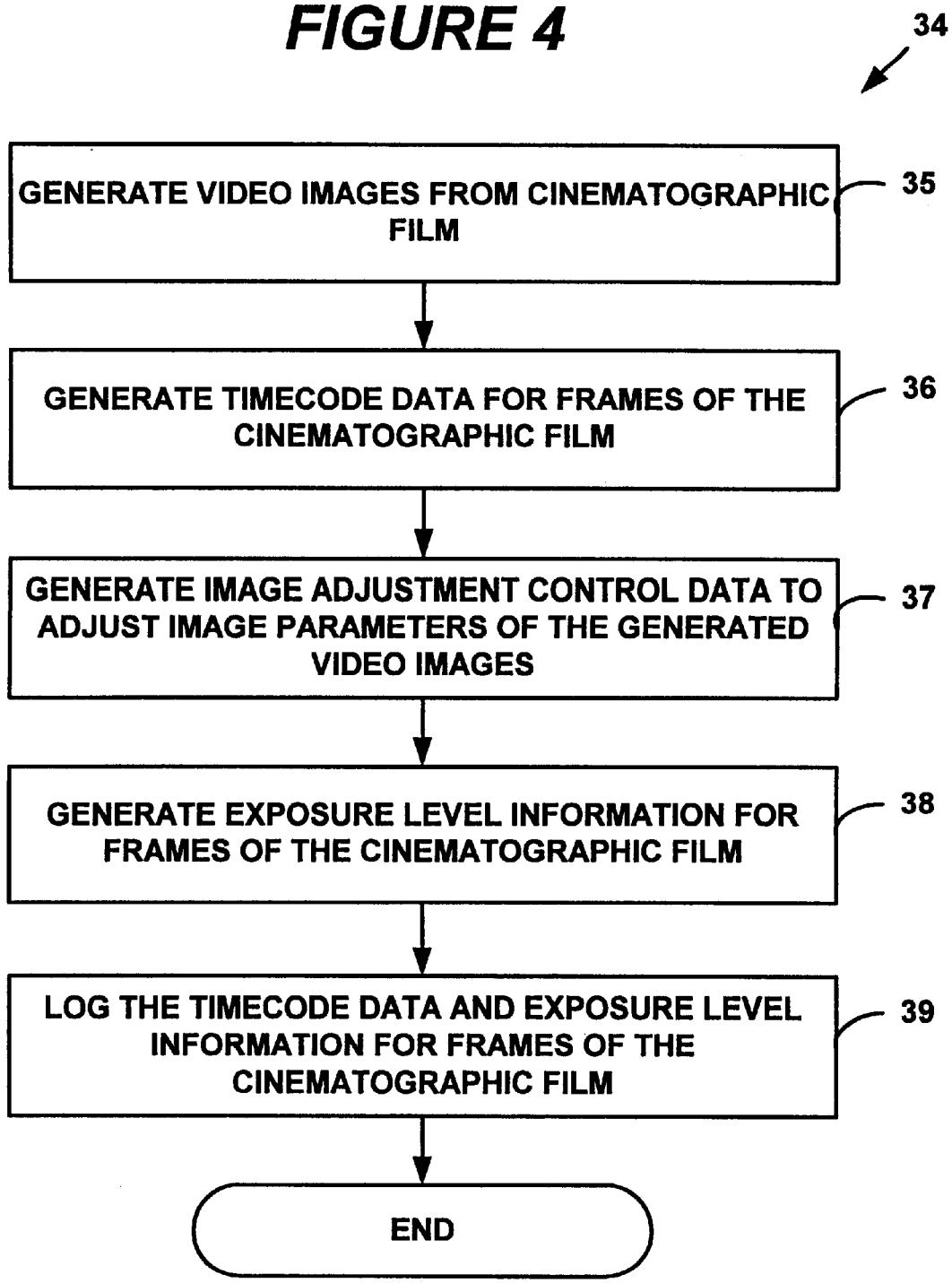

EXPOSURE CONTROL FOR CINEMATOGRAPHIC FILMS USING TELECINE APPARATUS

This application is a continuation in part of application Ser. No. 08/759,274 filed Dec. 2, 1996 now abandoned.

FIELD OF THE INVENTION

BACKGROUND OF THE INVENTION

This invention relates to the use of telecine apparatus for controlling the exposure of cinematographic, i.e. motion picture, films.

The shooting and developing of cinematographic film is a highly artistic process, with many adjustments being made during production in order to result in an end product of optimal quality. One of the aspects that requires control is the exposure of the film.

The variables that contribute to the lightness or darkness of exposed processed film include the following:

The exposure speed of the film stock;

The age and storage conditions of the film stock;

The aperture selected on the film camera;

The lighting conditions and/or weather, depending on whether the film is being shot indoors or outdoors;

The condition of the film processing bath; and

The time spent in the processing bath.

Typically, film shot one day is processed overnight and viewed first thing in the morning. The results of this viewing usually generate data for the fine tuning of the exposure of the film for that day. Traditionally, the exposed film is viewed by projection through a cinema projector onto a screen.

Once a film has been completed, it may be converted into a video format for distribution on, e.g., video tapes or discs or for broadcast. It is usual to convert the film material into electrical signals using a telecine machine. Such a machine consists of a film transport, together with an optoelectric mechanism for sampling the requisite number of lines to make a television picture. Examples of such machines include the URSA Gold machine, manufactured by Cintel International Limited (formerly Rank Cintel Ltd) in Ware, England, and the FDL90 machine, manufactured by BTS in Darmstadt, Germany.

Telecine machines are designed to accept a very wide range of quality of film material, from extremely underexposed to extremely overexposed. Compensation for poor exposure is accomplished by electrical signal processing within the electronics of the telecine machine. Further signal processing equipment that can affect the visual attributes of the picture include devices referred to as secondary colour correctors. Whilst it is the primary function of such devices to alter certain colour attributes, they can also affect the overall signal level. One such example of a secondary colour corrector is the DCP manufactured by Pandora International Ltd. in Kent, England. In practice, such a device would be controlled in use by a Pandora POGLE controller also manufactured by Pandora International Ltd. The electrical signal processing can be accomplished either in the analogue domain, via analogue 'characteristic' changing, with capacitive and inductive components, or preferably with digital lookup tables. These tables are one dimensional, and the input value is used as the address at which to look up the data that is used as the output value. This is standard technique in the design of digital electronic circuitry. In practice, all professional telecine control is accomplished from programmer/controller devices such as the Pandora POGLE or the Da Vinci RENAISSANCE. Such control signals may include, but are not limited to: Master Gain; Master Lift; Master Gamma; Differential Gain; Differential Lift; Differential Gamma; and Secondary corrections of each of the Red, Green or Blue content of the Red, Green, Blue, Cyan, Magenta and Yellow. The control settings in both of the above devices are digital parameters, which are usually not interrogated by the operator, but are internally stored in conjunction with either a scene number or a timecode reference. This allows scene-by-scene programming.

Whilst the use of such equipment results in a satisfactory end product in video format, it has no effect on the quality of the original cinematographic film, and any problems with exposure will remain.

In U.S. Pat. No. 5,276,522 of Terence W. Mead there is proposed a telecine machine in which the original film is scanned, corrections and editing is carried out on the scanned images, and then a second cinematographic film is produced by using a cathode ray tube as a writer to expose the film. The resultant film will be of inferior quality to film produced in a conventional optical manner using a camera or printing a positive from a negative. Although the film produced by Mead may include colour correction and other editing decisions, there are significant disadvantages as compared to the production of film by conventional optical means.

During the production of a cinematographic film it is known to view the film in a video format on a television type monitor. This is desired for a number of reasons. One reason is that it is common to shoot negative material, which is analogous to the negatives that one receives with prints shot in a stills camera. To view negative material, it is necessary to print it onto positive material prior to viewing it. Thus this is an expensive and time consuming extra process, and also a stage adding another degree of variation. Another reason for wanting to view the film in video format on a monitor is that the material may be expressly intended for television distribution, and therefore this may be the best way to judge its quality and content for that purpose. To view the film in a television or video format, it is possible to use a telecine machine. However, a problem is that it is possible to produce evenly balanced television images from film that is significantly under or over exposed, that being a feature of conventional telecine machines. In such cases there is no indication to the film shooting crew that the exposure is incorrect. In any event, even if it is noticed that there is serious under or over exposure, there is still the problem of how to deal with this on the film that has actually been shot if it is wished to keep that take.

SUMMARY OF THE INVENTION

One object of the present invention is to provide a method whereby a telecine machine can be operated to generate data that is used to control the printing of positive film from exposed negative film, with compensation for sub-optimal exposure levels in that negative film.

Another object of the present invention is to provide a method whereby a telecine machine can be used to generate data that is used by film shooting personnel to adjust the exposure levels in subsequent film shooting sessions.

In one aspect of the present invention, there is provided a method of operating a telecine machine in a process for printing positive cinematographic film from negative cinematographic film, comprising the steps of:

a) using the telecine machine to generate video images from the negative cinematographic film;

b) generating timecode data identifying frames of the negative cinematographic film;

c) generating image adjustment control data to adjust image parameters of the video images generated by the telecine machine, so as to produce video images of a desired quality;

d) using the image adjustment control data to generate exposure level information for frames of the negative cinematographic film;

e) logging in a film exposure logging system timecode data and exposure level information for frames of the negative cinematographic film;

f) using the exposure level information to generate exposure compensation printing settings;

g) printing the positive cinematographic film from the negative cinematographic film, by a printing process in which light is passed through the negative cinematographic film to the unexposed positive cinematographic film; and h) using the exposure compensation printing settings during the printing process to provide compensation for sub-optimal exposure levels of frames in the negative cinematographic film.

In another aspect of the present invention, there is provided a method of controlling a telecine machine to produce an exposure log of cinematographic film, comprising the steps of:

a) using a telecine machine to generate video images from the cinematographic film;

b) generating timecode data for frames of the cinematographic film;

c) generating image adjustment control data to adjust image parameters of the video images generated by the telecine machine so as to produce video images of a desired quality;

d) using the image adjustment control data to generate exposure level information for frames of the cinematographic film; and e) logging in a film exposure logging system timecode data and exposure level information for frames of the cinematographic film so as to provide the exposure log.

In one embodiment, the cinematographic film is negative cinematographic film and the exposure log is used to generate exposure compensation printing settings for frames of the negative cinematographic film. The method includes the further step of printing positive cinematographic film from the negative cinematographic film, using the exposure compensation printing settings to provide compensation for sub-optimal exposure levels of frames in the negative cinematographic film. In another embodiment the exposure log is used to control the exposure of subsequent negative cinematographic film.

In modem telecine machines or secondary colour correctors, the control signals for the various signal processing functions are digital signals. In accordance with preferred embodiments of the present invention, these digital signals can be intercepted and processed to provide exposure information which can be displayed in a window on the telecine controller, or for example routed to an external device such as an industry standard Personal Computer (PC) which can be used to log the exposure level of various scenes of the film. This logging preferably takes place together with the industry standard timecode signal, to build up a table of timecode versus exposure level.

One use of the timecode and exposure information is to control a film printing machine. Such a machine is necessary to convert negative film material into positive. This may be accomplished by 'contact printing', where the exposed negative film stock is placed in contact with unexposed positive film stock. This is then illuminated from a light source, through a series of electrically selectable filters to control the exposure level and colour balance. An optical film printer may be utilized of the type originally manufactured by Bell & Howell Ltd. in the United Kingdom, or other types. The method of controlling such a device may be either a simple method of typing in the frame numbers of the start and end of each scene, and the corresponding red, green and blue filter values for that scene, or the automatic transfer of this data into the film printer via such serial line protocols as RS-232 or parallel protocols as RS-422.

In a further implementation of the invention, a procedure may be initiated where the film camera crew shoot an industry standard grey card. During the telecine stage, the telecine transfer operator, when he recognises this card, presses a calibration button. This process would initiate the telecine controller to disable all signal processing corrections, thus making the telecine become a linear device. Therefore, in this mode, the level of the video signal output from the telecine would produce an exposure index of the film. In a development of this, the derived video signal from the telecine machine may be used in a feedback-type mechanism to control the video parameters on a telecine controller to produce automatic correction of material. In this mode, an operator selects the grey card image, and knows that for optimum reproduction a video level of, say, 200 millivolts is required. Via a feedback and comparator arrangement, the gain and/or lift controls are incremented or incremented until the video level is at the required level. For optimum control of multiple parameters, such as gain, lift, and gamma, a multilevel film image would be required, containing for example a 'white', 'grey', and 'black' steps. Of coursed, for any calibration step a colour chart or grey scale could be used instead of the grey card, although grey cards are more commonly available.

In the case of the 'POGLE Platinum' telecine controller from Pandora the hardware of the controller may be one of the range of general purpose computer workstations from Silicon Graphics Incorporated, of Mountain View, Calif., USA. Such models from SGI that are suitable for this purpose are 8-bit graphics versions of the SGI 'Indy' or 'O2'. Such workstations have 32 Mbytes of RAM, and a 1.2 Gbyte SCSI hard disc. Software running on these workstations is typically the IRIX version 6.2 Operating system. Programming for applications such as the film exposure calibration may include compilers for the language 'C', and X-Windows functionality, together with the SGI provided 'OpenGL' graphics library.

Using the above workstation, the comparator and feedback process can be carried out digitally, which is preferable to analog electrical methods. As an example, it may be that a mid grey card, when shot optimally onto photographic film, and processed optimally, should produce a consistent digital level, for example 128, in each of the three output channels (Red, Green and Blue) of a telecine with flat, i.e. linear, characteristics loaded. In cases of poor lighting, the actual levels produced in the video signal may be 110, 110, 95. Thus the telecine controller can compare the actual video level with the desired video level. On discovering that the actual is lower than the desire, the telecine controller can alter the gain tables to be downloaded into the telecine, whilst monitoring the video level. It is obvious in this example that the gain in blue needs to be increased more than that in red and green. Typical gain incremental parameters for this example, may be +4 in Red, +4 in Green and +11 in Blue. From these incremental gain parameters on the telecine it is possible to derive equivalent film printer filter values. This equivalence can be either theoretically derived, or derived by experimental calibration. For example, for film that needs +4, +4, +11 correction, values of filter on the film printer that are required to correct the print can be tried out experimentally, and the values that achieve the desired effect may be stored.

The feedback method described above simplifies adjustment of the telecine controller to compensate for under or over exposure, and the control data used to achieve that compensation is then used to produce the exposure log for the film. The grey card calibration frame is identified in the exposure log and is used as a base level for the correction levels of the other frames or scenes of the film.

BRIEF DESCRIPTION OF THE DRAWINGS

The above and other features and advantages of the invention may be more readily understood by reference to the following description of preferred embodiment taken in conjunction with the accompanying drawings, in which:

FIG. 3 is a flow diagram illustrating a method of operating a telecine machine in a process for printing positive cinematographic film from negative cinematographic film; and FIG. 4 is a flow diagram illustrating a method of controlling a telecine machine to produce an exposure log of cinematographic film.

DETAILED DESCRIPTION OF THE PREFERRED EMBODIMENT

Figure 1:
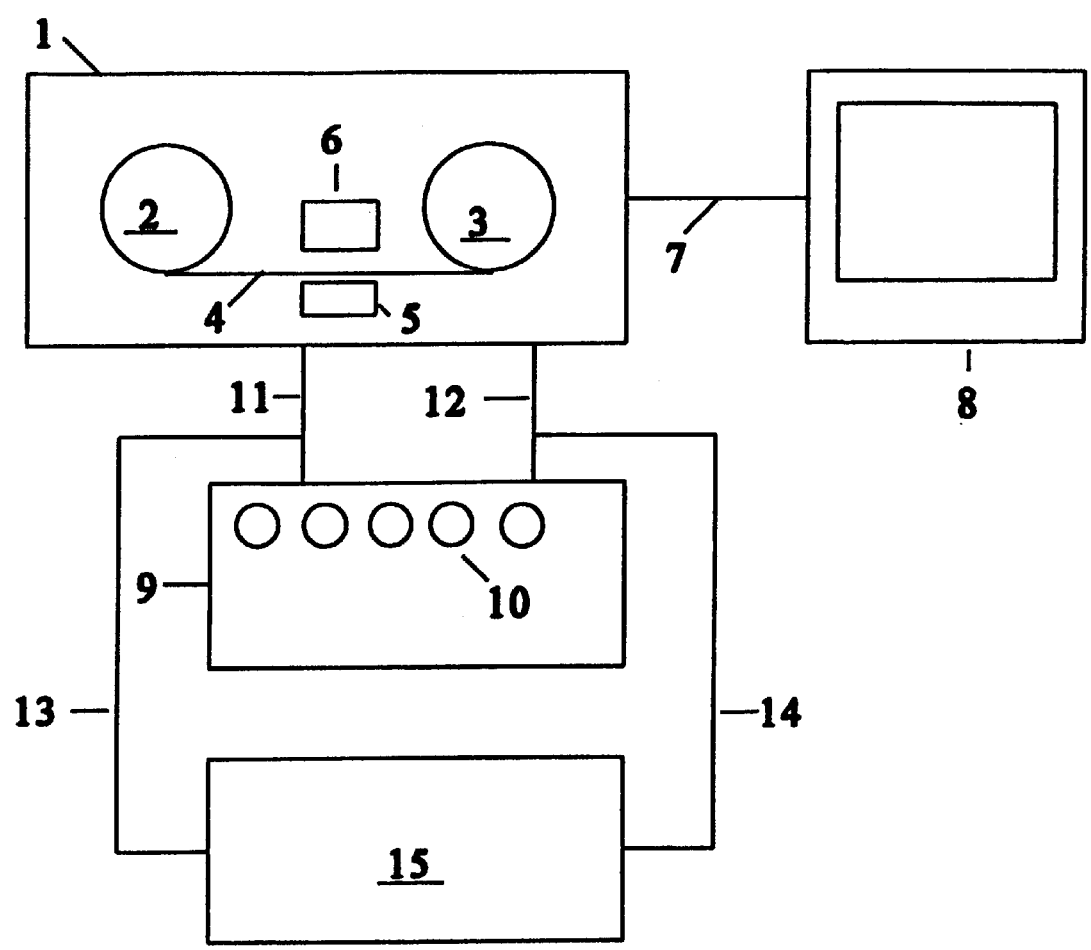
FIG. 1 shows schematically the use of a telecine machine and controller to produce an exposure log in accordance with the invention.

Referring to FIG. 1, a telecine machine 1 has reels 2 and 3 carrying exposed negative cinematographic film 4. Frames of the film are scanned by a flying spot CRT tube 5 and the light is analysed by a unit 6 which detects the red, green and blue components using optical transducers in a conventional manner. The telecine machine 1 produces a video output which is fed along a line 7 to a video monitor 8 for viewing by an operator. The telecine 1 may be of a type such as the URSA or URSA Gold manufactured by Cintel International Limited in Ware, England or the FDL90 manufactured by BTS in Darmstadt, Germany. The video signals may also be transmitted to a storage device, such as a video recorder, for storage on video tape or disc or other suitable media.

The telecine 1 is controlled by a controller 9 having controls 10 for operation by a user having regard to the image displayed on the monitor 8. The controller 9 sends control data via channel 11 to the telecine 1, and sends synchronisation data in the form of timecode to the telecine 1 via channel 12. The film will generally contain its own synchronisation data or timecode (also known as filmcode or keycode) and the timecode for the entire system may be based on this data. Alternatively, the timecode for the system may be generated in the controller 9 and passed to the telecine 1. In either case, the timecode generates a unique identification value for each frame of the film which is consistent throughout the whole system.

The control signals passed to the telecine 1 from the controller 9 include the following parameters: Master Gain; Master Lift; Master Gamma; Differential Gain; Differential Lift; Differential Gamma; and Secondary corrections of each of the Red, Green or Blue content of each of the Red, Green, Blue, Cyan, Magenta and Yellow channels. The adjustment of these various parameters by the operator of the controller 9, using the controls 10, with reference to the representation of the film image displayed on the monitor 8 produces a resultant electrical image of optimum quality from the image stored on the exposed negative cinematographic film 4.

The control data from the controller 9 is also passed to a film exposure logging system 15, via channel 13. The timecode signal from the controller 9 is also passed to the logging system 15, via channel 14. The control data and timecode values for each frame may be stored in the logging system 15. However, to reduce the amount of data stored in the logging system 15, only the control data and start and end timecode values for a whole scene, as defined by an operator, may be stored. This also considerably simplifies the further processing of the film exposure log.

The exposure log data stored in the logging system 15 is converted, by means of an empirically-derived relationship stored in a look-up table in the logging system 15, into settings for the compensated printing of positive film from the negative film 4. The conversion values in the look-up table are derived by reference to one frame of the film 4 which includes a shot of a standard grey card, such as is commercially available from Kodak. The grey card has predetermined levels of red, blue and green content and thus the control data for this frame provides a calibration of the required correction of the film 4, i.e. the degree of parameter correction required to correct the red, blue and green levels of the image of the grey card stored on the film 4 to the known levels is a measure of the degree of under or over exposure of the film 4. Thus, the grey card calibration frame is identified in the exposure log and is used as a base level for the correction levels of the other frames or scenes of the film 4.

Figure 2:
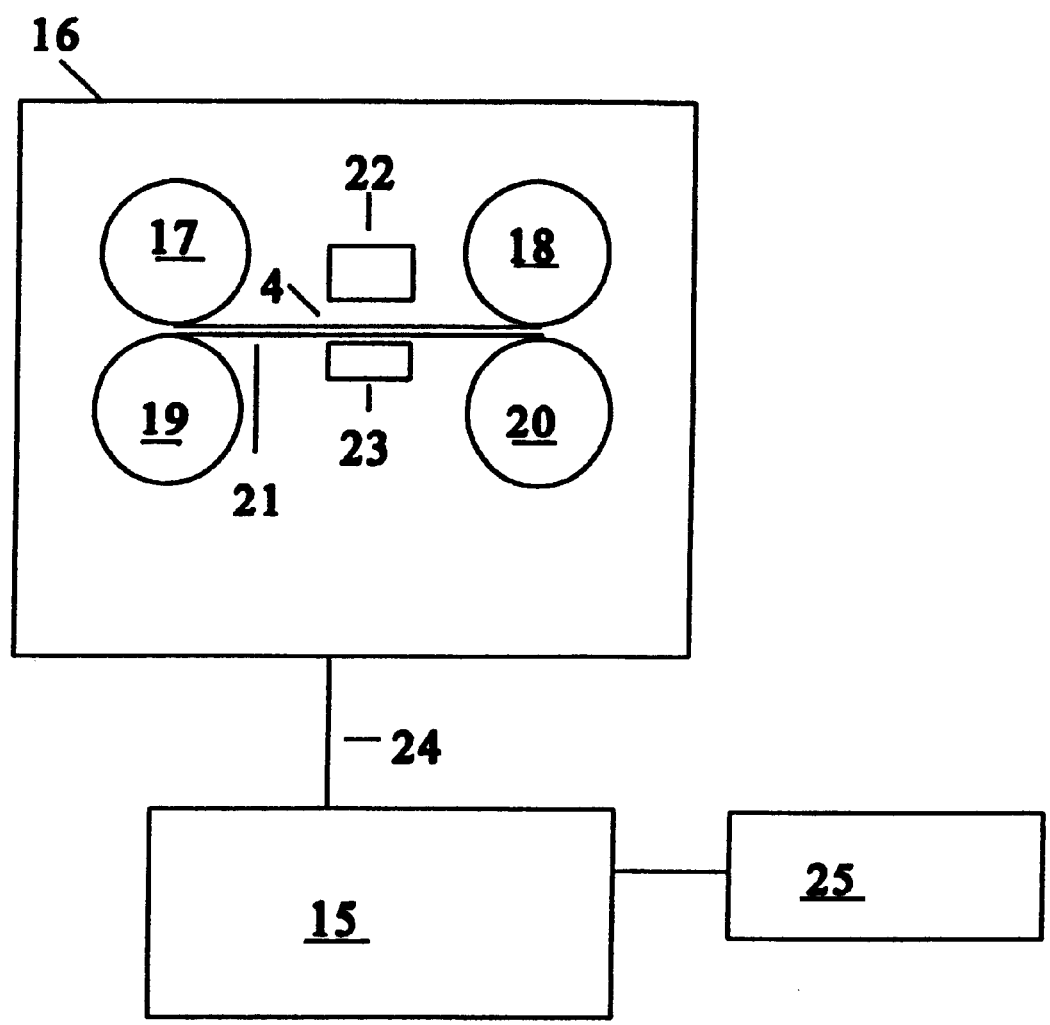
FIG. 2 shows schematically how the exposure log can be used to provide exposure compensation in the printing of positive film.

FIG. 2 illustrates how the exposure logging system 15 is used to control printing of positive film with exposure compensation A contact printer 16 comprises reels 17 and 18 for the original exposed negative film 4, and reels 19 and 20 for unexposed positive film 21. The films 4 and 21 are brought together in a region where a light source 22 provides light which passes through the original negative film 4 to expose the positive film 21 which is supported on a base 23. An interface 24 connects the light source to the exposure logging system 15, so that the exposure can be controlled to compensate for exposure problems with the negative film 4. Additionally or alternatively the exposure compensation system could display exposure settings on a suitable display 25, for an operator to control the printer manually or to program it in a particular way. After exposure the positive film 21 is developed in a conventional manner.

The information in the film exposure logging system 15 may also or alternatively be used by a film director or other person to control the exposure settings for subsequent scenes in which negative cinematographic film is used. It will be possible to ascertain from the log how the exposure level changes. If the same or a similar scene is re-shot, then steps can be taken to compensate for exposure problems that might arise according to information in the exposure logging system. Even for different scenes the exposure log will provide useful information as to how various locations or events might affect optimal exposure levels. The exposure log provides a reference for film director, cinematographer or the like.

FIG. 3 is a flow diagram showing a method 26 of operating a telecine machine in a process for printing positive cinematographic film from negative cinematographic film. The telecine machine is used to generate video images from the negative cinematographic film, as shown in step 27. In step 28, timecode data is generated. The timecode data identifies frames of the negative cinematographic film. Image adjustment control data is generated to adjust image parameters of the video images generated by the telecine machine, as shown in step 29. The adjustment of the image parameters produces video images of a desired quality. The image adjustment control data is then used to generate exposure level information for frames of the negative cinematographic film, as shown in step 30. In step 31, timecode data and exposure level information for frames of the negative cinematographic film are logged in a film exposure logging system. The exposure level information is used to generate exposure compensation printing settings, as shown in step 32. In step 33, positive cinematographic film is printed from the negative cinematographic film, by a printing process in which light passes through the negative cinematographic film to the unexposed positive cinematographic film, as shown in step 33. The exposure compensation printing settings are used during the printing process to provide compensation for sub-optimal exposure levels of frames in the negative cinematographic film.

FIG. 4 is a flow diagram showing a method 34 of controlling a telecine machine to produce an exposure log of cinematographic film. A telecine machine is used to generate video images from the cinematographic film, as shown in step 35. In step 36, timecode data is generated for frames of the cinematographic film. Image adjustment control data is generated to adjust image parameters of the video images generated by the telecine machine so as to produce video images of a desired quality, as shown by step 37. In step 38, the image adjustment control data is used to generate exposure level information for frames of the cinematographic film. In step 39, timecode data and exposure level information for frames of the cinematographic film is logged in a film exposure logging system so as to provide the exposure log.

It will be appreciated that while a telecine controller may be used to make many types of change to the video image from scanning the film, for example by changing the colours of specific regions of a frame, for the purposes of the present invention the data required will represent the overall exposure of the film frames. It is this that will be used to set the exposure in the contact printing process for the positive film, or will be used to set exposures for subsequent film shots.

Although there has been described above what is at present considered to be the preferred embodiment of the present invention, it will be understood by those skilled in the art that various modifications of and deviations from the disclosed exemplary system may be made without departing from the spirit or scope of the invention as defined by the appended claims.

What is claimed is:

1. A method of operating a telecine machine in a process for printing positive cinematographic film from negative cinematographic film, comprising the steps of:
   a) using the telecine machine to generate video images from the negative cinematographic film;
   b) generating timecode data identifying frames of the negative cinematographic film;
   c) generating image adjustment control data to adjust image parameters of the video images generated by the telecine machine, so as to produce video images of a desired quality;
   d) using the image adjustment control data to generate exposure level information for frames of the negative cinematographic film;
   e) logging in a film exposure logging system timecode data and exposure level information for frames of the negative cinematographic film;
   f) using the exposure level information to generate exposure compensation printing settings;
   g) printing the positive cinematographic film from the negative cinematographic film, by a printing process in which light passes through the negative cinematographic film to the unexposed positive cinematographic film; and
   h) using the exposure compensation printing settings during the printing process to provide compensation for sub-optimal exposure levels of frames in the negative cinematographic film.

2. A method according to claim 1, wherein at least one of the frames in the negative cinematographic film contains a calibration image which is used to calibrate the image adjustment control data.

3. A method according to claim 1, in which the video images produced by the telecine machine are displayed on a video monitor and the image adjustment control data to adjust image parameters of the video images are established by reference to the images displayed on the monitor.

4. A method of controlling a telecine machine to produce an exposure log of cinematographic film, comprising the steps of:
   a) using a telecine machine to generate video images from the cinematographic film;
   b) generating timecode data for frames of the cinematographic film;
   c) generating image adjustment control data to adjust image parameters of the video images generated by the telecine machine so as to produce video images of a desired quality;
   d) using the image adjustment control data to generate exposure level information for frames of the cinematographic film; and
   e) logging in a film exposure logging system timecode data and exposure level information for frames of the cinematographic film so as to provide the exposure log.

5. A method according to claim 4, wherein the cinematographic film is negative cinematographic film and the exposure log is used to generate exposure compensation printing settings for frames of the negative cinematographic film; and wherein the method includes the further step of printing positive cinematographic film from the negative cinematographic film, using the exposure compensation printing settings to provide compensation for sub-optimal exposure levels of frames in the negative cinematographic film.

6. A method according to claim 5, wherein printing of the positive cinematographic film is carried out by a printing process in which light passes through the negative cinematographic film to the unexposed positive cinematographic film.

7. A method according to claim 4, wherein the exposure log is used to control the exposure of subsequent negative cinematographic film.

8. A method according to claim 4, wherein at least one of the frames in the negative cinematographic film contains a calibration image which is used to calibrate the image adjustment control data.

9. A method according to claim 4, in which the video images produced by the telecine machine are displayed on a video monitor and the image adjustment control data to adjust image parameters of the video images are established by reference to the images displayed on the monitor.

* * * * *